United States Patent
Johnson et al.

(10) Patent No.: US 7,835,272 B1
(45) Date of Patent: Nov. 16, 2010

(54) BACKHAUL PATH DIVERSITY FOR WIRELESS NETWORKS

(75) Inventors: Harold Wayne Johnson, Roach, MO (US); Timothy D. Euler, Leawood, KS (US); David L. Harris, Pleasanton, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 281 days.

(21) Appl. No.: 11/942,098

(22) Filed: Nov. 19, 2007

(51) Int. Cl.
*H04J 1/16* (2006.01)

(52) U.S. Cl. .................................................. 370/228

(58) Field of Classification Search ................ 370/228, 370/216–235, 244, 242, 450, 454, 522, 398, 370/395.2, 247–253; 379/40, 39, 80, 59; 714/2, 39, 47, 705
See application file for complete search history.

(56) References Cited

U.S. PATENT DOCUMENTS

| | | | | |
|---|---|---|---|---|
| 5,454,024 A | * | 9/1995 | Lebowitz | 379/40 |
| 6,038,219 A | * | 3/2000 | Mawhinney et al. | 370/242 |
| 6,154,445 A | * | 11/2000 | Farris et al. | 370/237 |
| 6,611,506 B1 | | 8/2003 | Huang et al. | |
| 7,315,538 B2 | * | 1/2008 | Wright et al. | 370/352 |
| 7,352,693 B2 | * | 4/2008 | Seid et al. | 370/216 |
| 7,436,851 B1 | * | 10/2008 | Chambers | 370/467 |
| 7,519,021 B1 | * | 4/2009 | Johnson | 370/328 |
| 2002/0131409 A1 | | 9/2002 | Frank et al. | |
| 2007/0202910 A1 | * | 8/2007 | Brewer et al. | 455/521 |

* cited by examiner

*Primary Examiner*—Chi H Pham
*Assistant Examiner*—Alexander Boakye (57) ABSTRACT

A method and apparatus for switching backhaul communication links is disclosed. The method comprises monitoring communication traffic flowing across a primary backhaul communication link. When a problem is detected with the primary backhaul communication link, the traffic is shifted from the primary backhaul communication link onto a secondary backhaul communication link. The traffic may be shifted based upon voice traffic types. The traffic may be shifted based upon voice traffic types and data traffic types.

13 Claims, 5 Drawing Sheets

BACKHAUL PATH DIVERSITY FOR WIRELESS NETWORKS

TECHNICAL BACKGROUND

Wireless communication information is exchanged via a wireless link with base stations (BS). Base stations exchange this information with switch sites via backhaul communication links. When the backhaul communication link fails, all wireless links are dropped. There is typically a backhaul communication link for each base station. Therefore a backhaul failure only affects one base station, or only a portion of traffic. A multi-tier backhaul architecture concentrates multiple base stations onto a single backhaul communication link. With this architecture, a single backhaul communication link failure can affect as many as a thousand wireless communication links.

Overview

A method and apparatus for switching backhaul communication links is disclosed. The method comprises monitoring communication traffic flowing across a primary backhaul communication link. When a problem is detected with the primary backhaul communication link, the traffic is shifted from the primary backhaul communication link onto a secondary backhaul communication link. The traffic may be shifted based upon voice traffic types. The traffic may be shifted based upon voice traffic types and data traffic types.

DETAILED DESCRIPTION

Figure 1:
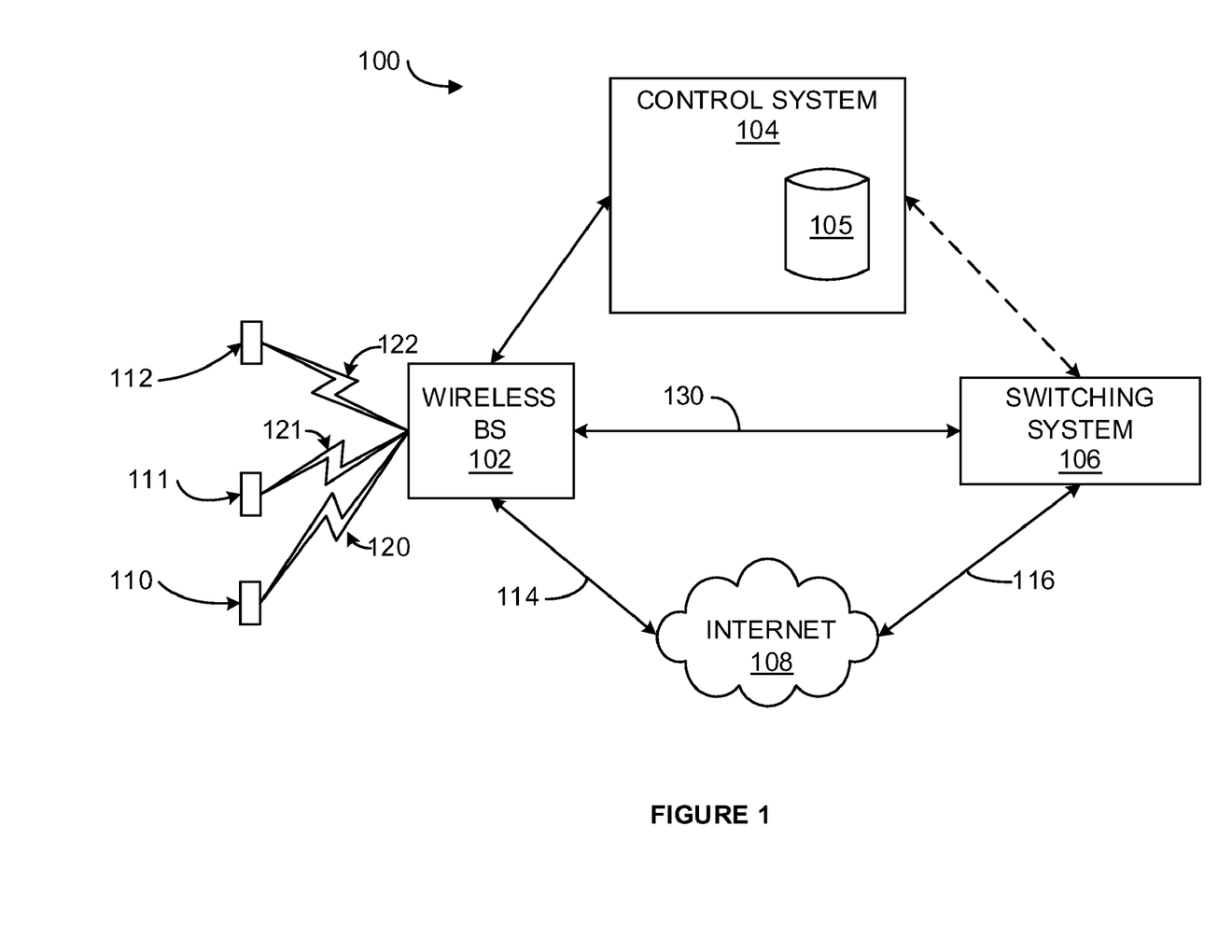
FIG. 1 is a block diagram illustrating a wireless communication network.

FIG. 1 is a block diagram illustrating a wireless communication network. Wireless communication network 100 comprises a plurality of wireless devices 110-112, base station 102, control system 104, switching system 106, and an internet 108. Wireless devices 110-112 may be, for example, a combination of cell phones, wireless modems, personal digital assistants (PDA), or other wireless communication devices. Control system 104 may include or communicate with database 105.

The plurality of wireless devices 110-112 communicate with base station 102 via wireless communication links 120-122, respectively. Base station 102 is operatively coupled to control system 104. Base station 102 is coupled to switching system 106 across a primary backhaul communication link 130. Base station 102 is also operatively coupled to switching system 106 via a secondary backhaul communication link comprising communication link 114, internet 108, and communication link 116. Control system 104 may also be coupled to switching system 106.

During normal operations, all of the communication traffic to and from base station 102 is exchanged with switching system 106 via primary backhaul communication link 130. When a problem occurs on primary backhaul communication link 130, communication traffic can be shifted onto a secondary backhaul communication link comprising communication link 114, internet 108, and communication link 116. In some cases, the secondary backhaul communication link may not have the capacity to handle all the traffic carried by the primary backhaul communication link 130. When the secondary backhaul communication link does not have the capacity to handle all the traffic carried by primary backhaul communication link 130, portions of the traffic are shifted onto the secondary backhaul communication link according to a priority scheme.

For example, base station 102 may track all current emergency service calls. If base station 102 detects a loss of signal or other problem on primary link 130, then base station 102 switches the current emergency service calls to the back-up link (108, 114, 116). Alternatively, base station 102 could query control system 104 to identify the current emergency service calls.

The priority scheme shifts subsets of the traffic on the primary backhaul communication link 130 to the secondary backhaul communication link based upon the types assigned to the subsets of the traffic. In the past there were two primary types of traffic, voice traffic and data traffic. Now that some voice traffic is being sent using Voice over Internet Protocol (VoIP), some voice traffic may now be embedded into data traffic. Voice traffic and data traffic can be further divided into a number of different types of traffic.

Voice traffic may be divided into a number of different types. These types include, but are not limited to: emergency voice traffic (911), premium customer voice traffic, and normal voice traffic. Premium customer voice traffic may be, for example, voice traffic from police, hospitals, government organizations, and customers that pay a premium. Data traffic may also be divided into a number of different types. These types include, but are not limited to: VoIP traffic, high priority data traffic, high Quality of Service (QoS) data traffic, normal data traffic, and low QoS data traffic. VoIP data traffic may also be further divided into a number of different types. These types include, but are not limited to: high priority VoIP traffic, normal VoIP traffic and low priority VoIP traffic.

In an embodiment, the priority scheme shifts traffic from the primary backhaul communication link 130 to the secondary backhaul communication link according to the priority scheme until the traffic fills the secondary backhaul communication link to capacity. Alternatively, the priority scheme shifts traffic from the primary backhaul communication link 130 to the secondary backhaul communication link according to the priority scheme until the traffic fills the secondary backhaul communication link to a predetermined level of capacity, such as 90% of capacity.

In an example, the priority scheme shifts the highest priority traffic first, higher priority traffic next, lower priority traffic next, and the lowest priority traffic last. Generally, all voice traffic has a higher priority than data traffic. However, some VoIP data traffic may have a higher priority than some normal voice traffic. For example, high priority VoIP traffic may have a higher priority than normal voice traffic.

In another example, the priority scheme shifts traffic from the primary backhaul communication link 130 to the secondary backhaul communication link until all the high priority traffic has been shifted to the secondary backhaul communication link. Lower priority traffic is not shifted. The high priority traffic may comprise all the voice traffic and all of the VoIP data traffic.

In an embodiment, a method for switching traffic from a primary backhaul communication link 120 to a secondary backhaul communication link comprises monitoring the communication traffic flowing via a primary backhaul communication link. When a problem is detected with the primary backhaul communication link 130, the traffic is shifted from the primary backhaul communication link 130 onto a secondary backhaul communication link.

Traffic is shifted based upon a type assigned to subsets of the voice traffic. The highest priority voice traffic is shifted onto the secondary backhaul communication link first. This is followed by the other types of voice traffic in priority order. An example of the highest priority voice traffic would be 911 voice traffic and/or other emergency service provider voice traffic.

In another example, subsets of traffic are shifted based on voice traffic types and data traffic types. The voice traffic types include emergency service voice traffic, PCS 1XRTT voice traffic, premium customer voice traffic, high priority VoIP traffic, normal voice traffic, normal VoIP traffic, low priority VoIP traffic, and integrated dispatch enhanced network (iDEN) voice traffic. The traffic subsets are shifted using a priority scheme or a priority ranking.

In an example, the priority ranking may be in the following order from highest to lowest: emergency service voice traffic, premium customer voice traffic, high priority VoIP traffic, normal voice traffic, normal VoIP traffic, high priority data traffic, high QoS data traffic, low priority VoIP traffic, normal data, and low QoS data traffic. In other examples, the priority of some of the types of traffic may be switched with other types of traffic and/or different types of traffic may be grouped together as a single priority type. In another example, all the different types of VoIP traffic may be grouped together as a single VoIP type.

In an embodiment, base station 102 may sort the traffic carried by primary backhaul communication link 130 by types. In another embodiment, base station 102 may query control system 104, which may query database 105, to enable sorting the traffic by priority types. Traffic may be sorted or grouped into subsets using a number of different techniques or a combination of different techniques.

For example, traffic may be sorted using one or more of the following: Medium Access Control (MAC) address, a physical port number, a logical port number, the called number, the calling number, an Internet Protocol (IP) address, a user ID, emergency service information, priority bits in the packet headers, bit marks, and priority tags. Control system 104 may contain a database of sorting criteria. This database may be stored in database 150. This database may include, but is not limited to, a database of high priority numbers such as high priority telephone numbers, a database of high priority ports, or a database of high priority IP addresses.

In an embodiment, base station 102 may monitor primary backhaul communication link 130. Base station may detect a problem with primary backhaul communication link 130 and initiate the switch to the secondary backhaul communication link. Base station 102 may use a loss of signal on the primary backhaul communication link 130 as a trigger to switch to the secondary backhaul communication link. In other examples, control system 104 or switching system 106 may monitor primary backhaul communication link 130. Control system 104 or switching system 106 may detect the problem with primary backhaul communication link 130 and initiate a switch to the secondary backhaul communication link. Control system 104 or switching system 106 may use loss of signal, bit error rate, weather information, delay, packet loss, or a combination of the above, as a trigger to switch to the secondary backhaul communication link.

Figure 2:
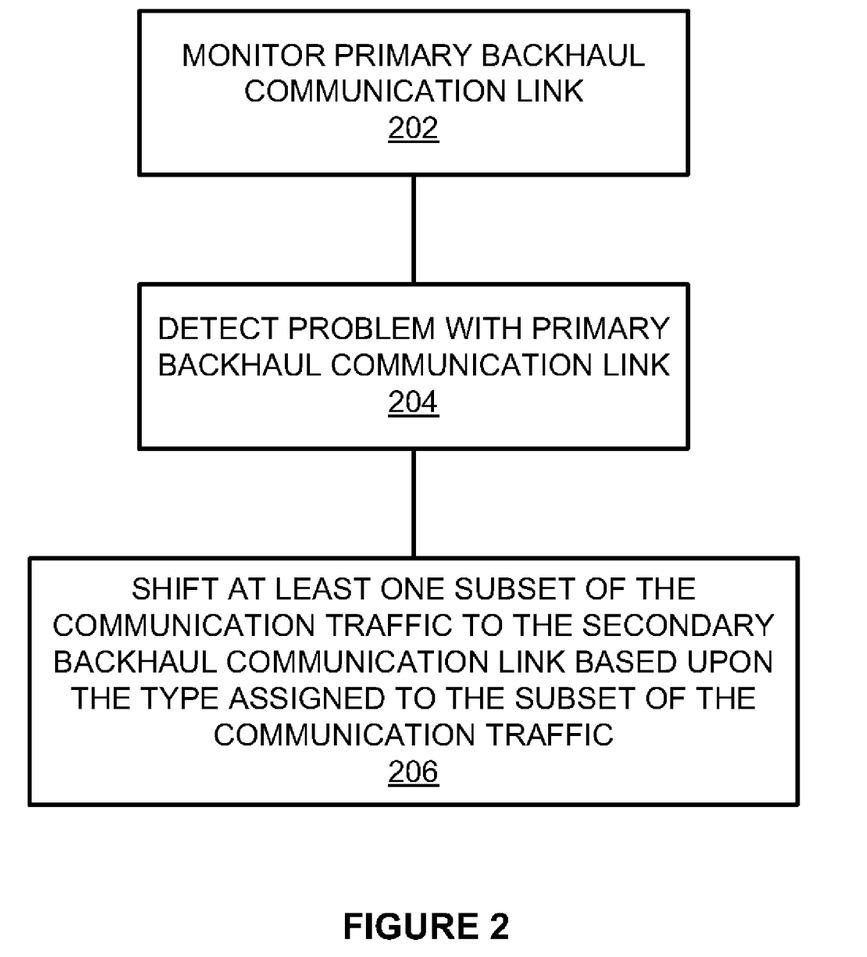
FIG. 2 is a flowchart illustrating a method for switching traffic from a primary backhaul communication link to a secondary backhaul communication link.

FIG. 2 is a flowchart illustrating a method for switching traffic from a primary backhaul communication link. The primary backhaul communication link is monitored (202). Problems with the primary backhaul communication link may be detected by this monitoring (204). For example, a loss of signal condition, bit error rates, weather information, delays, packet losses, or a combination of the above, may be monitored to detect a problem with the primary backhaul communication link. When a problem is detected with the primary backhaul communication link, at least one subset of the communication traffic on the primary backhaul communication link is shifted to the secondary backhaul communication link. The subsets of traffic that are shifted are chosen based upon the type assigned to that particular subset (206). The subsets of traffic that are shifted may be chosen according to a priority scheme similar to the priority scheme described above for wireless network 100.

For example, the subset of the traffic that is shifted is determined by the types assigned to the subsets of the voice traffic. The highest priority voice traffic is shifted onto the secondary backhaul communication link first. This is followed by the other types of voice traffic in priority order. An example of a type of the highest priority voice traffic would be emergency service voice traffic and/or other emergency service provider voice traffic.

In another example, a subset of traffic is shifted based on voice traffic types and data traffic types. Voice traffic types include, but are not limited to: emergency service voice traffic, PCS 1XRTT voice traffic, premium customer voice traffic, high priority VoIP traffic, normal voice traffic, normal VoIP traffic, low priority VoIP traffic, and integrated dispatch enhanced network (iDEN) voice traffic.

The subsets of traffic may be shifted using a priority scheme or a priority ranking. For example, the priority ranking may be in the following order of traffic types from highest to lowest: emergency service voice traffic, premium customer voice traffic, high priority VoIP traffic, normal voice traffic, normal VoIP traffic, high priority data traffic, high QoS data traffic, low priority VoIP traffic, normal data, and low QoS data traffic. In other examples, the priority of some of the types of traffic may be switched with other types of traffic and/or different types of traffic may be grouped together as a single priority type. In another example, all the different types of VoIP traffic may be grouped together as a single VoIP type.

To accomplish dividing the traffic into subsets, the traffic may be sorted using a number of different techniques or a combination of different techniques. For example, the traffic may be sorted using one or more of the following: Medium Access Control (MAC) address, a physical port number, a logical port number, the called number, the calling number, an Internet Protocol (IP) address, a user ID, emergency service information, priority bits in the packet headers, bit marks, and priority tags. In addition, the traffic may be sorted by maintaining a database that selects a traffic type for certain traffic. This database may include, but is not limited to, a database of high priority numbers such as high priority telephone numbers, a database of high priority ports, or a database of high priority IP addresses.

Figure 3:
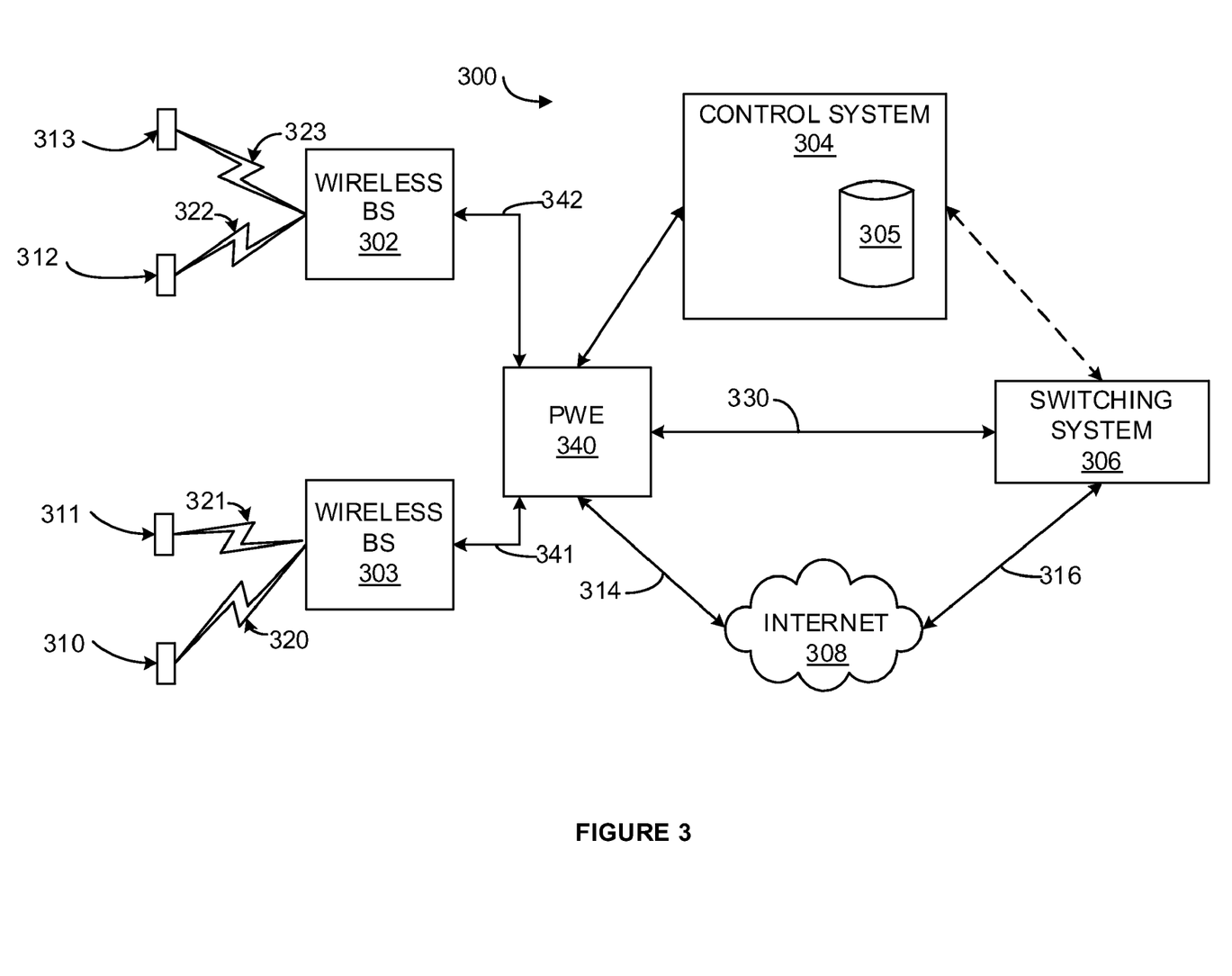
FIG. 3 is a block diagram illustrating a wireless communication network.

FIG. 3 is a block diagram illustrating a wireless network. Wireless communication network 300 comprises a plurality of wireless devices 310-313, base stations 302 and 303, pseudo-wire emulator (PWE) 340, control system 304, switching system 306, and an internet 308. Wireless devices 310-313 may be, for example, a combination of cell phones, wireless modems, personal digital assistants (PDA), or other wireless communication devices. Control system 304 may include or communicate with database 305.

Wireless devices 310 and 311 communicate with base station 303 via wireless communication links 320 and 321, respectively. Wireless devices 312 and 313 communicate with base station 302 via wireless communication links 322 and 323, respectively. Base stations 302 and 303 are operatively coupled to pseudo-wire emulator 340 via communication links 342 and 341, respectively.

Pseudo-wire emulator 340 is operatively coupled to switching system 306 across a primary backhaul communication link 330. Pseudo-wire emulator 340 is also operatively coupled to switching system 306 via a secondary backhaul communication link comprising communication link 314, internet 308, and communication link 316. In an embodiment, communication links 314 and 316 may include third party modems, cable modems, or digital subscriber lines to operatively couple pseudo-wire emulator 340 or switching system 306 to internet 308. Pseudo-wire emulator 340 is operatively coupled to control system 304. Control system 304 may also be coupled to switching system 306.

During normal operations, all of the communication traffic to and from each of the base stations 302 and 303 is exchanged with pseudo-wire emulator 340 via communication links 341 and 342, respectively. Pseudo-wire emulator 340 concentrates all the communications traffic to and from base stations 302 and 303. Pseudo-wire emulator exchanges the concentrated traffic with switching system 306 via primary backhaul communication link 330.

When a problem occurs on primary backhaul communication link 330, backhaul traffic can be shifted onto a secondary backhaul communication link via internet 308 using communication links 314 and 316. The secondary backhaul communication link may not have the capacity to handle all the communication traffic carried by primary backhaul communication link 330. When the secondary backhaul communication link does not have the capacity to handle all the traffic carried by primary backhaul communication link 330, portions of the traffic are shifted onto the secondary backhaul communication link according to a priority scheme. The priority scheme used to shift traffic from primary backhaul communication link 330 to the secondary backhaul communication link is similar to the priority scheme describe above for wireless network 100.

In an embodiment, pseudo-wire emulator 340 may sort the communication traffic carried by primary backhaul communication link 330 by priority types. Pseudo-wire emulator 340 may query control system 304, which may then query database 305, to enable the sorting of traffic by priority types. Traffic may be sorted or grouped into subsets using a number of different techniques or a combination of different techniques.

For example, traffic may be sorted using one or more of the following: Medium Access Control (MAC) address, a physical port number, a logical port number, the called number, the calling number, an Internet Protocol (IP) address, a user ID, emergency service information, priority bits in the packet headers, bit marks, and priority tags. Control system 304 may contain a database of sorting criteria. This database may be stored in database 305. This database may include, but is not limited to, a database of high priority numbers such as high priority telephone numbers, a database of high priority ports, or a database of high priority IP addresses.

In an embodiment, pseudo-wire emulator 340 may monitor primary backhaul communication link 330. Base station may detect a problem with primary backhaul communication link 330 and initiate the switch to the secondary backhaul communication link. Pseudo-wire emulator 340 may use a loss of signal on the primary backhaul communication link 330 as a trigger to switch to the secondary backhaul communication link. In other examples, control system 304 or switching system 306 may monitor primary backhaul communication link 330. Control system 304 or switching system 306 may detect the problem with primary backhaul communication link 330 and initiate a switch to the secondary backhaul communication link. Control system 304 or switching system 306 may use loss of signal, bit error rate, weather information, delay, packet loss, or a combination of the above, as a trigger to switch to the secondary backhaul communication link.

In the embodiment described above, pseudo-wire emulator 340 aggregates traffic, monitors primary backhaul communication link 330, and switches the traffic to the secondary backhaul communication link based on a priority scheme. Alternatively, other aggregation devices, such as multiplexers, switches, gateways, and routers, may be configured and operate in a similar manner. Thus, many different types of communication equipment could aggregate traffic from the base stations, monitor the primary backhaul communication link, and switch the traffic to a secondary backhaul communication link based on a priority scheme as described above.

In many areas communication networks may use a landline based Ethernet system, for example a local cable company, as the backhaul communication link between base stations and the switching system in the communication network. As base stations proliferate, some base stations may be placed beyond the reach of any landline based Ethernet system. A fixed wireless access link may be used to bridge the gap between base station and the landline based Ethernet system.

Figure 4:
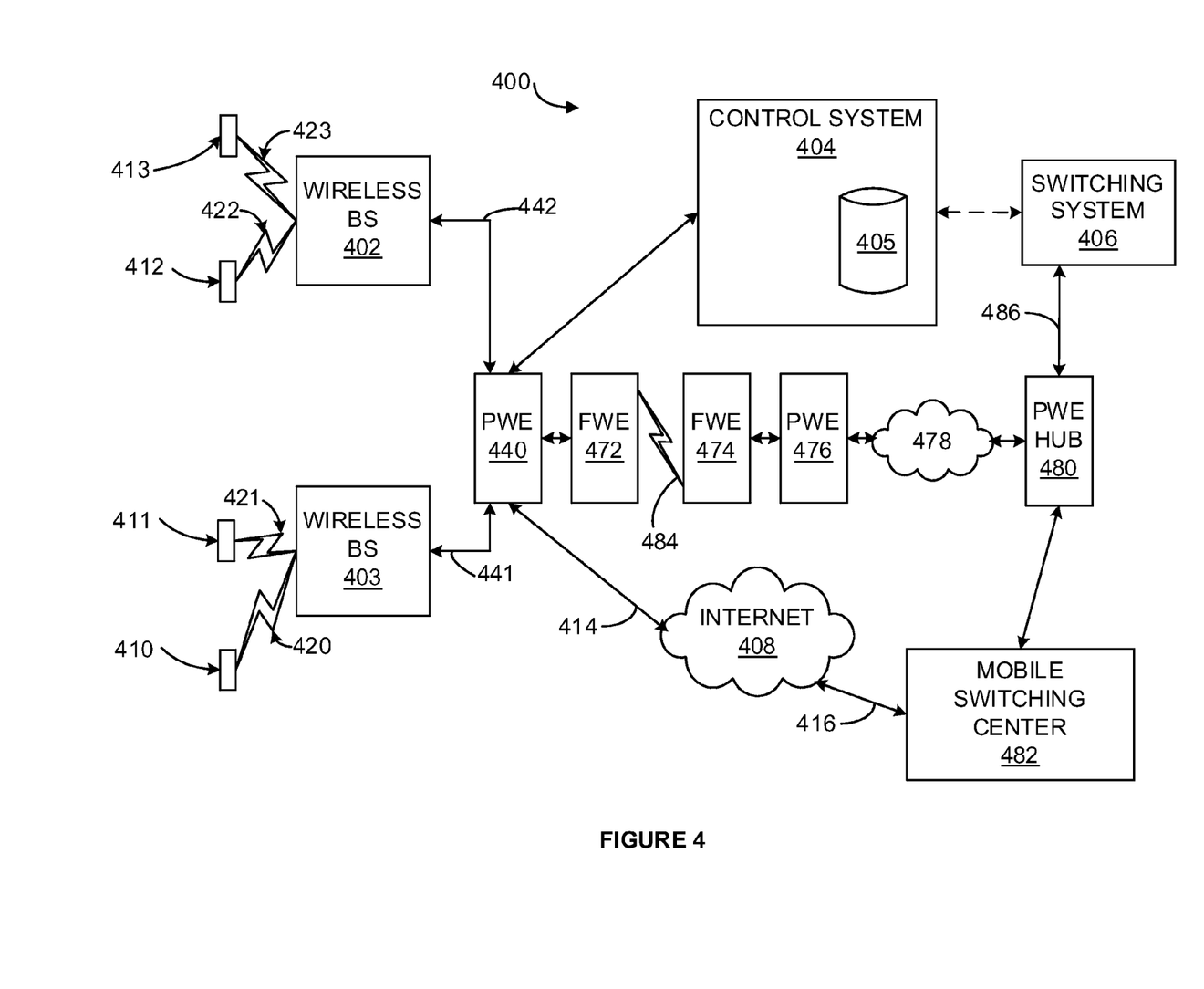
FIG. 4 is a block diagram illustrating a wireless communication network.

FIG. 4 is a block diagram illustrating a wireless communication network. Wireless communication network 400 comprises a plurality of wireless devices 410-413, base stations 402 and 403, pseudo-wire emulators 440 and 476, control system 404, switching system 406, an internet 408, fixed wireless Ethernet (FWE) systems 472 and 474, landline based Ethernet system 478, pseudo-wire emulator hub 480, and mobile switching center 441. Wireless devices 410-413 may be, for example, a combination of cell phones, wireless modems, personal digital assistants (PDA), or other wireless communication devices. Control system 404 may include or communicate with database 405.

Wireless devices 410 and 411 communicate with base station 403 via wireless communication links 420 and 421, respectively. Wireless devices 412 and 413 communicate with base station 402 via wireless communication links 422 and 423, respectively. Base stations 402 and 403 are operatively coupled to pseudo-wire emulator 440 via communication links 442 and 441, respectively. PWE 440 is operatively coupled to control system 404. Control system 404 may also be coupled to switching system 406.

PWE 440 is operatively coupled to internet 408 via link 414. Internet 408 is operatively coupled to mobile switching center 482. Mobile switching center 482 is operatively coupled to PWE hub 480. PWE 440 is also operatively coupled to FWE system 472. FWE system 472 is operatively coupled to FWE system 474 across wireless link 484. FWE system 474 is operatively coupled to PWE 476. PWE 476 is operatively coupled to landline based Ethernet system 478. Landline based Ethernet system 478 is operatively coupled to PWE hub 480. PWE hub 480 is operatively coupled to switching system 406 via link 486.

A primary backhaul communication link that exchanges communications between base stations 402 and 403 and switching system 406 comprises: base stations 402 and 403 exchanging communications with PWE 440 via communication links 442 and 441, respectively; PWE 440 exchanging communications with FWE 472; FWE 472 exchanging communications with FWE 474 via wireless link 484; FWE 474 exchanging communications with PWE 476; PWE 476 exchanging communications with PWE hub 480 via landline based Ethernet system 478; and, PWE hub 480 exchanging communications with switching system 406.

A secondary backhaul communication link that connects base stations 402 and 403 to switching system 406 comprises: base stations 402 and 403 exchanging communications with PWE 440 via communication links 442 and 441, respectively; PWE 440 exchanging communications with mobile switching center 482 via communication link 414, internet 408, and communication link 416; mobile switching center 482 exchanging communications with PWE hub 480; and, PWE hub 480 exchanging communications with switching system 406.

In an embodiment, communication link 414 may use third party modems, cable modems, or DSL modems to operatively couple PWE 440 to internet 408. In another example, mobile switching center 482 may use traffic peering for traffic handoff to PWE hub 480.

During normal operations, all of the traffic to and from communication links 441 and 442 is exchanged with switching system 406 across the primary backhaul communication link. In an embodiment, communication links 441 and 442 may be one or more T1 lines. Pseudo-wire emulator 440 concentrates all communications traffic to and from all of the T1 lines and converts the communications into Ethernet communications. Pseudo-wire emulator 440 and fixed wireless Ethernet system 472 exchange the Ethernet communications with each other. Fixed wireless Ethernet system 472 and fixed wireless Ethernet system 474 exchange the Ethernet communications with each other via wireless link 484. Fixed wireless Ethernet system 474 and PWE 476 exchange the Ethernet communications with each other. PWE 476 and PWE hub 480 exchange the Ethernet communications with each other via landline based Ethernet system 478. PWE hub 480 converts the Ethernet communications back into T1 communications. PWE hub 480 and switching system 406 exchange the T1 communications via communications link 486. In an example, landline based Ethernet system 478 may be a local cable company.

If a problem occurs on the primary backhaul communication link, traffic is shifted onto the secondary backhaul communication link. When the secondary backhaul communication link does not have the capacity to handle all the traffic from the primary backhaul communication link, the traffic is shifted onto the secondary backhaul communication link according to a priority scheme. The priority scheme used to shift traffic from the primary backhaul communication link to the secondary backhaul communication link is similar to the priority scheme describe above for the wireless network 100.

In an embodiment, pseudo-wire emulator 440 may sort the communication traffic carried by the primary backhaul communication link by priority types. Pseudo-wire emulator 440 may query control system 404, which may then query database 405, to enable the sorting of traffic by priority types. Traffic may be sorted or grouped into subsets using a number of different techniques or a combination of different techniques.

For example, traffic may be sorted using one or more of the following: Medium access control (MAC) address, a physical port number, a logical port number, the called number, the calling number, an Internet Protocol (IP) address, a user ID, emergency service information, priority bits in the packet headers, bit marks, and priority tags. Control system 404 may contain a database of sorting criteria. This database may be stored in database 405. This database may include, but is not limited to, a database of high priority numbers such as high priority telephone numbers, a database of high priority ports, or a database of high priority IP addresses.

In an embodiment, pseudo-wire emulator 440 may monitor primary backhaul communication link 430. Base station may detect a problem with primary backhaul communication link 430 and initiate the switch to the secondary backhaul communication link. Pseudo-wire emulator 440 may use a loss of signal on the primary backhaul communication link 430 as a trigger to switch to the secondary backhaul communication link. In other examples, control system 404 or switching system 406 may monitor primary backhaul communication link 430. Control system 404 or switching system 406 may detect the problem with primary backhaul communication link 430 and initiate a switch to the secondary backhaul communication link. Control system 404 or switching system 406 may use loss of signal, bit error rate, weather information, delay, packet loss, or a combination of the above, as a trigger to switch to the secondary backhaul communication link. When using weather information, the switch to the secondary backhaul communication link may be made before a weather system reaches the location of the wireless link 484.

In the embodiment described above, pseudo-wire emulator 440 aggregates traffic, monitors primary backhaul communication link 430, and switches the traffic to the secondary backhaul communication link based on a priority scheme. Alternatively, other aggregation devices, such as multiplexers, switches, gateways, and routers, may be configured and operate in a similar manner. Thus, many different types of communication equipment could aggregate traffic from the base stations, monitor the primary backhaul communication link, and switch the traffic to a secondary backhaul communication link based on a priority scheme as described above.

The methods, systems, networks, databases, and communication links described above may be implemented with or executed by one or more computer systems. The methods described above may also be stored on a computer readable medium. Many of the elements of communication networks 100, 300, and 400 may be, comprise, or include computers systems. This includes, but is not limited to: communication networks 100, 300, and 400; wireless devices 110-112, 310-313 and 410-413; base stations 102, 302-303 and 402-403; control system 104, 304, and 404; databases 105, 305, 405; switching systems 106, 306, 406; internets 108, 308, 408; pseudo-wire emulators 340, 440, and 476; fixed wireless Ethernet systems 472 and 474; landline based Ethernet system 478; pseudo-wire emulator hub 480; and, mobile switching center 482.

Figure 5:
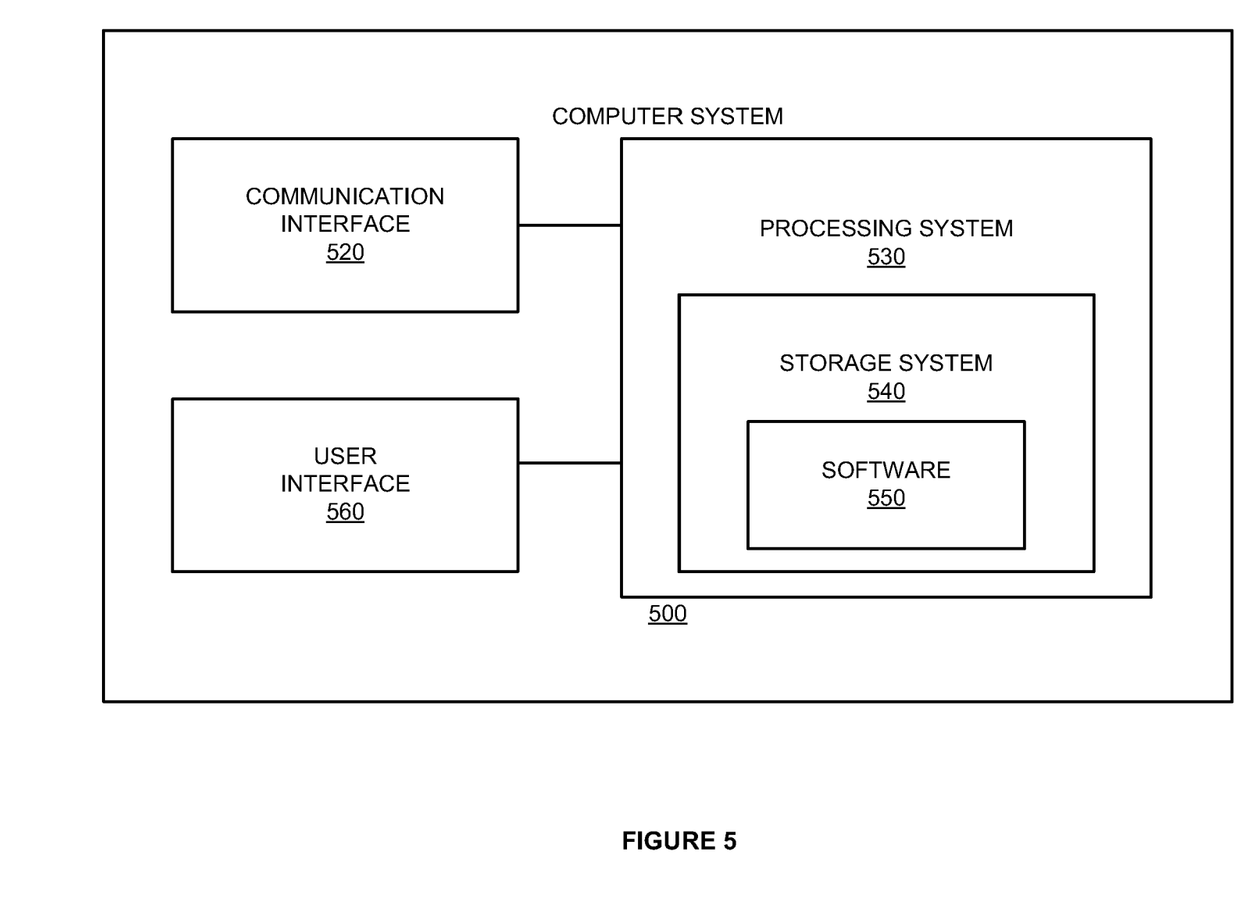
FIG. 5 is a block diagram illustrating a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 510-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system, comprising:
    a base station coupled to a switching system via a primary backhaul communication link;
    a control system coupled to the base station and coupled to the switching system;
    a secondary backhaul communication link having a first link coupling the base station to an internet and a second link coupling the internet to the switching system;
    wherein the base station is configured to use the control system to monitor traffic flowing across the primary backhaul communication link; and,
    when a problem is detected on the primary backhaul communication link, the base station is configured to switch traffic to the secondary backhaul communication link based on voice traffic types, wherein the base station is configured to switch emergency service traffic from the primary backhaul communication link onto the secondary backhaul communication link before switching non-emergency service traffic when the problem is detected.

2. The communication system of claim 1 wherein the traffic is switched to the secondary backhaul communication link based on voice traffic types and data traffic types.

3. The communication system of claim 2 wherein the voice traffic types and the data traffic types are selected from the group consisting of: emergency service voice traffic, PCS 1XRTT voice traffic, premium customer voice traffic, high priority VoIP traffic, normal voice traffic, normal VoIP traffic, low priority VoIP traffic, and integrated dispatch enhanced network (iDEN) voice traffic, high priority data traffic, high quality of service data traffic, normal data traffic, and low quality of service data traffic.

4. A method for backhaul communication link switching, comprising:
    aggregating communications exchanged by a plurality of base stations and a pseudo-wire emulator at the pseudo-wire emulator;
    converting the aggregated communications into Ethernet communications;
    exchanging the Ethernet communications via a primary backhaul communication link wherein the primary backhaul communication link has at least one fixed wireless Ethernet link and at least one landline based Ethernet link; and,
    when a problem is detected with the primary backhaul communication link,
        moving traffic from the primary backhaul communication link onto a secondary backhaul communication link based on voice traffic types.

5. The method for backhaul communication link switching of claim 4 wherein the voice traffic types are selected from the group consisting of: emergency service voice traffic, premium customer voice traffic, normal voice traffic, PCS 1XRTT voice traffic and integrated dispatch enhanced network (iDEN) voice traffic.

6. The method for backhaul communication link switching of claim 4 wherein the traffic flowing across the primary backhaul communication link is monitored using at least one of the techniques selected from the group consisting of: loss of signal, bit error rate, delay, packet loss, and weather information.

7. The method for backhaul communication link switching of claim 4 wherein the traffic type is determined using at least one of the methods selected from the group consisting of: Medium access control (MAC) address, a physical port number, a logical port number, the called number, the calling number, an Internet Protocol (IP) address, a user ID, emergency service information, priority bits in the packet headers, bit marks, and priority tags.

8. The method for backhaul communication link switching of claim 4, further comprising:
    moving traffic from the primary backhaul communication link onto the secondary backhaul communication link based on voice traffic type and data traffic type.

9. The method for backhaul communication link switching of claim 8 wherein the voice traffic types and the data traffic types are selected from the group consisting of: emergency service voice traffic, PCS 1XRTT voice traffic, premium customer voice traffic, high priority VoIP traffic, normal voice traffic, normal VoIP traffic, low priority VoIP traffic, and integrated dispatch enhanced network (iDEN) voice traffic, high priority data traffic, high quality of service data traffic, normal data traffic, and low quality of service data traffic.

10. A communication system, comprising:
    a plurality of base stations coupled to an aggregation device;
    a switching system coupled to the an aggregation device across a primary backhaul communication link;
    a database system coupled to the an aggregation device;
    a secondary backhaul communication link having a first link coupling the an aggregation device to an internet and a second link coupling the internet to the switching system; and,
    when a problem is detected on the primary backhaul communication link, the aggregation device is configured to switch traffic to the secondary backhaul communication link based on voice traffic types, wherein the an aggregation device is configured to access the database system to determine at least one indicator that differentiates the voice traffic types.

11. The communication system of claim 10, wherein the at least one indicator that differentiates the voice traffic types is selected from the group consisting of: Medium Access Control (MAC) address, a physical port number, a logical port number, the called number, the calling number, an Internet Protocol (IP) address, a user ID, emergency service information, priority bits in the packet headers, bit marks, and priority tags.

12. The communication system of claim 10, wherein the an aggregation device comprises a pseudo-wire emulator and wherein the primary backhaul communication link comprises:

a fixed wireless Ethernet link coupled to the pseudo-wire emulator; and     a landline based Ethernet system coupled to the fixed wireless Ethernet link and coupled to the switching system.

13. The communication system of claim 12, wherein the traffic flowing across the primary backhaul communication link is monitored using weather information and the traffic flowing across the primary backhaul communication link may be switched to the secondary backhaul communication link before a weather system reaches the fixed wireless Ethernet link.

\* \* \* \* \*